United States Patent
Ren et al.

(10) Patent No.: US 10,651,656 B2
(45) Date of Patent: May 12, 2020

(54) UDE-BASED ROBUST DROOP CONTROL FOR PARALLEL INVERTER OPERATION

(71) Applicant: Texas Tech University System, Lubbock, TX (US)

(72) Inventors: Beibei Ren, Lubbock, TX (US); Yeqin Wang, Lubbock, TX (US); Qing-Chang Zhong, Willowbrook, IL (US)

(73) Assignee: Texas Tech University System, Lubbock, TX (US)

( * ) Notice: Subject to any disclaimer, the term of this patent is extended or adjusted under 35 U.S.C. 154(b) by 264 days.

(21) Appl. No.: 15/698,956

(22) Filed: Sep. 8, 2017

(65) Prior Publication Data

US 2018/0076630 A1    Mar. 15, 2018

Related U.S. Application Data

(60) Provisional application No. 62/394,303, filed on Sep. 14, 2016.

(51) Int. Cl.
*H02J 3/46* (2006.01)
*H02M 7/5395* (2006.01)
(Continued)

(52) U.S. Cl.
CPC ............ *H02J 3/46* (2013.01); *H02M 7/493* (2013.01); *H02M 7/5395* (2013.01); *H02M 2001/0025* (2013.01)

(58) Field of Classification Search
CPC ........ H02J 3/46; H02M 7/493; H02M 7/5395; H02M 2001/0025
(Continued)

(56) References Cited

U.S. PATENT DOCUMENTS 5,191,519 A * 3/1993 Kawakami ............... H02J 3/46
363/71
7,274,181 B2 9/2007 Schrom et al.
(Continued)

OTHER PUBLICATIONS

Bollman, A. M., An Experimental Study of Frequency Droop Control in a Low-Inertia Microgrid, Thesis, Master of Science in Electrical and Computer Engineering, University of Illinois at Urbana-Chapaign (2009) 60 pages.
(Continued)

*Primary Examiner* — Thienvu V Tran
*Assistant Examiner* — Brian K Baxter
(74) *Attorney, Agent, or Firm* — Loza & Loza LLP; Kevin L. Soules

(57) ABSTRACT

A control system and method include a control strategy and a UDE (Uncertainty and Disturbance Estimator)-based controller incorporated into the control strategy to achieve proportional load sharing for parallel-operated inverters. The UDE-based controller regulates the reactive power against the output generated by a reactive power reference unit according to the load voltage to generate the amplitude of the control voltage. The conventional droop method regulates real power to generate the phase of the control voltage. As a result, the model uncertainties (e.g., parameter drifts and uncertain output impedance), and system disturbances (e.g., fluctuating DC-link voltage and load change) can be estimated and compensated for accurate load sharing.

13 Claims, 9 Drawing Sheets

(51) Int. Cl.
*H02M 7/493* (2007.01)
*H02M 1/00* (2006.01)
(58) Field of Classification Search
USPC .......................................................... 307/82
See application file for complete search history.

(56) References Cited

U.S. PATENT DOCUMENTS

| | | | |
|---|---|---|---|
| 7,577,006 B2 | 8/2009 | Neacsu | |
| 7,933,101 B2* | 4/2011 | Bourgeau | H02P 9/006 |
| | | | 361/21 |
| 8,841,787 B1 | 9/2014 | Folken et al. | |
| 8,860,394 B2 | 10/2014 | Houston et al. | |
| 8,964,419 B2 | 2/2015 | Ryoo et al. | |
| 9,187,093 B1 | 11/2015 | Sujan | |
| 9,401,640 B2 | 7/2016 | Karlsson et al. | |
| 9,705,419 B2 | 7/2017 | Lu et al. | |
| 9,742,189 B2 | 8/2017 | Watanabe et al. | |
| 9,742,411 B1 | 8/2017 | Fan et al. | |
| 9,882,386 B2* | 1/2018 | He | H02J 3/16 |
| 2007/0114796 A1* | 5/2007 | Garces | F03D 9/008 |
| | | | 290/43 |
| 2007/0135970 A1* | 6/2007 | Zhou | H02J 3/1835 |
| | | | 700/286 |
| 2013/0021829 A1* | 1/2013 | Sao | H02J 3/38 |
| | | | 363/71 |
| 2016/0154388 A1 | 6/2016 | Gao et al. | |
| 2016/0248253 A1* | 8/2016 | Zimmanck | H02M 5/02 |
| 2017/0155247 A1 | 6/2017 | Liu et al. | |
| 2017/0160711 A1 | 6/2017 | Wong et al. | |
| 2017/0214243 A1 | 7/2017 | Rancuret et al. | |
| 2017/0214248 A1* | 7/2017 | Rowe | H02J 3/382 |
| 2017/0229857 A1 | 8/2017 | Kral et al. | |
| 2017/0229918 A1 | 8/2017 | Madawala et al. | |
| 2017/0316135 A1* | 11/2017 | Johnson | G01R 19/2513 |
| 2018/0013287 A1* | 1/2018 | Roose | H02J 3/1828 |
| 2019/0207391 A1* | 7/2019 | Fazeli | H02J 3/382 |

OTHER PUBLICATIONS

Ashabani, S. M. et al., A Flexible Control Strategy for Grid-Connected and Islanded Microgrids with Enhanced Stability Using Nonlinear Microgrid Stabilizer, IEEE Transactions on Smart Grid (2012) 3(3):1291-1301.
Ashabani, M. et al., Novel Comprehensive Control Framework for Incorporation VSCs to Smart Power Grids using Bidirectional Synchronous-VSC, IEEE Transactions on Power Systems (2014) 29(2):943-957.
Borup, U. et al., Sharing of Nonlinear Load in Parallel-Connected Three-Phase Converters, IEEE Transactions on Industry Applications (2001) 37(6):1817-1823.
Chandorkar, M. C. et al., Control of Parallel Connected Inverters in Standalone ac Supply Systems, IEEE Transactions on Industry Applications (1993) 29(1)136-143.
Guan, Y. et al., A New Way of Controlling Parallel-Connected Inverters by Using Synchronous-Reference-Frame Virtual Impedance Loop-Part I: Control Principle, IEEE Transactions on Power Electronics (2016) 31(6):4576-4593.
Guerrero, J. M. et al., Output Impedance Design of Parallel-Connected UPS Inverters with Wireless Load-Sharing Control, IEEE Transactions on Industrial Electronics (2005) 52(4):1126-1135.
Guerrero, J. M. et al., Control of Distributed Uniterruptible Power Supply Systems, IEEE Transactions on Industrial Electronics (2008) 55(8):2845-2859.
Guerrero, J. M. et al., Hierarchical Control of Droop-Controlled AC and DC Microgrids—A General Approach Toward Standardization, IEEE Transactions on Industrial Electronics (2011) 58(1):158-172.
Guerrero, J. M. et al., Advanced Control Architectures for Intelligent Mictrogrids—Part I: Decentralized and Hierarchical Control, IEEE Transactions on Industrial Electronics (2013) 60(4)1254-1262.

Han, H. et al., An Improved Droop Control Strategy for Reactive Power Sharing in Islanded Microgrid, IEEE Transactions on Power Electronics (2015) 30(6):3133-3141.
Han, H. et al., Review of Power Sharing Control Strategies for Islanding Operation of AC Microgrids, IEEE Transactions on Smart Grid (2016) 7(1):200-215.
Haughton, D. A. et al., A Linear State Estimation Formulation for Smart Distribution Systems, IEEE Transactions on Power Systems (2013) 28(2):1187-1195.
He, J. et al., An Enhanced Islanding Microgrid Reactive Power, Imbalance Power, and Harmonic Power Sharing Scheme, IEEE Transactions on Power Electronics (2015) 30(6):3389-3401.
Hu, J. et al., Virtual Flux Droop Method—A New Control Strategy of Inverters in Microgrids, IEEE Transactions on Power Electronics (2014) 29(9):4704-4711.
Kolhe, J. P. et al., Robust control of robot manipulators based on uncertainty and disturbance estimation, International Journal of Robust and Nonlinear Control (2013) 23:104-122.
Lee, C. -T. et al., A New Droop Control Method for the Autonomous Operation of Distributed Energy Resource Interface Converters, IEEE Transactions on Power Electronics (2013) 28(4):1980-1993.
Li, Y. W. et al., An Accurate Power Control Strategy for Power-Electronics-Interfaced Distributed Generation Units Operating in a Low-Voltage Multibus Microgrid, IEEE Transactions on Power Electronics (2009) 24(12):2977-2988.
Liu, S. et al., Impact of Communication Delays on Secondary Frequency Control in an Islanded Microgrid, IEEE Transactions on Industrial Electronics (2015) 62(4):2021-2031.
Mahmood, H. et al., Accurate Reactive Power Sharing in an Islanded Microgrid Using Adaptive Virtual Impedances, IEEE Transactions on Power Electronics (2015) 30(3)1605-1617.
Micallef, A. et al., Reactive Power Sharing and Voltage Harmonic Distortion Compensation of Droop Controlled Single Phase Islanded Microgrids, IEEE Transactions on Smart Grid (2014) 5(3):1149-1158.
Milczarek, A. et al., Reactive Power Management in Islanded Microgrid-Proportional Power Sharing in Hierarchical Droop Control, IEEE Transactions on Smart Grid (2015) 6(4):1631-1638.
Nutkani, I. U. et al., Linear Decentralized Power Sharing Schemes for Economic Operation of AC Microgrids, IEEE Transactions on Industrial Electronics (2016) 63(1):225-234.
Olivares, D.E. et al., Trends in Microgrid Control, IEEE Transactions on Smart Grid (2014) 5(4):1905-1919.
Ren, B. et al., Robust Control for a Class of Nonaffine Nonlinear Systems Based on the Uncertainty and Disturbance Estimator, IEEE Transactions on Industrial Electronics (2015) 62(9):5881-5888.
Ren, B. et al., UDE-based control of variable-speed wind turbine systems, International Journal of Control (2015) 16 pages.
Sao, C. K. et al., Autonomous Load Sharing of Voltage Source Converters, IEEE Transactions on Power Delivery (2005) 20(2):1009-1016.
Shafiee, Q. et al., Distributed Secondary Control for Islanded Microgrids—A Novel Approach, IEEE Transactions on Power Electronics (2014) 29(2):1018-1031.
Simpson-Porco, J. W. et al., Secondary Frequency and Voltage Control of Islanded Microgrids via Distributed Averaging, IEEE Transactions on Industrial Electronics (2015) 62(11):7025-7038.
Swaroop, D. et al., Dynamic Surface Control for a Class of Nonlinear Systems, IEEE Transactions on Automatic Control (2000) 45(10):1893-1899.
Tuladhar, A. et al., Control of Parallel Inverters in Distributed AC Power Systems with Consideration of Line Impedance Effect, IEEE Transactions on Industrial Applications (2000) 36(1):131-138.
Wang, W. et al., Analysis of microgrid inverter droop controller with virtual output impedance under non-linear load condition, IET Power Electrics (2014) 7(6):1547-1556.
Wang, Y. et al., Kalman-Filter-Based State Estimation for System Information Exchange in a Multi-bus Islanded Microgrid, 7th IET International Conference on Power Electronics, Machines and Drivers Apr. 8-10, 2014, 6 pages.
Wang, X. et al., Virtual-Impedance-Based Control for Voltage-Source and Current-Source Converters, IEEE Transactions on Power Electronics (2015) 30(12):7019-7037.

(56) References Cited

OTHER PUBLICATIONS

Wang, Y. et al., An Estimator-Based Distributed Voltage-Predictive Control Strategy for AC Islanded Microgrids, IEEE Transactions on Power Electronics (2015) 30(7)3934-3951.
Wu, T.-F. et al., A D-Σ Digital Control for Three-Phase Inverter to Achieve Active and Reactive Power Injection, IEEE Transactions on Industrial Electronics (2014) 61(8):3879-3890.
Yao, W. et al., Design and Analysis of the Droop Control Method for Parallel Inverters Considering the Impact of the Complex Impedance on the Power Sharing, IEEE Transactions on Industrial Electronics (2011) 58(2):576-588.
Yazdanian, M. et al., Distributed Control Techniques in Microgrids, IEEE Transactions on Smart Grid (2014) 5 (6)2901-2909.
Yuan, X. et al., DC-link Voltage Control of a Full Power Converter for Wind Generator Operating in Weak-Grid Systems, IEEE Transactions on Power Electronics (2009) 24(9)2178-2192.
Zhang, Y. et al., Analysis of Networked Control Schemes and Data-Processing Method for Parallel Inverters, IEEE Transactions on Industrial Electronics (2014) 61(4):1834-1844.
Zhong, Q.-C. et al., Control of Uncertain LTI Systems Based on an Uncertainty and Disturbance Estimator, Journal of Dynamic Systems, Measurement, and Control (2004) 126:905-910.
Zhong, Q.-C. et al., Control of Power Inverters in Renewable Energy and Smart Grid Integration (2013) John Wiley & Sons, United Kingdom, 395 pages.
Zhong, Q.-C., Robust Droop Controller for Accurate Proportional Load Sharing Among Inverters Operated in Parallel, IEEE Transactions on Industrial Electronics (2013) 60(4)1281-1290.

\* cited by examiner

UDE-BASED ROBUST DROOP CONTROL FOR PARALLEL INVERTER OPERATION

CROSS-REFERENCE TO PROVISIONAL APPLICATION

This nonprovisional patent application claims the benefit of and priority under 35 U.S.C. § 119(e) to U.S. Provisional Patent Application Ser. No. 62/394,303, filed on Sep. 14, 2016, entitled "UDE-Based Robust Droop Control for Parallel Inverter Operation." U.S. Provisional Patent Application Ser. No. 62/394,303 is incorporated herein by reference in its entirety.

TECHNICAL FIELD

Embodiments are related to control devices for parallel operated inverters to achieve accurate proportional load sharing. Embodiments are also related to microgrid, smart grid, and renewable energy applications. Embodiments further relate to UDE (Uncertainty and Disturbance Estimator)-based control methods.

BACKGROUND

The use of renewable energy technologies, such as wind and solar energy, is vastly increasing. With their increasing use, their incorporation into power grids is essential for taking advantage of the energy they produce. The incorporation of these technologies into these grids requires the use of devices that turn direct current into alternating current called power inverters. Because of the high demand for power and the growing capacity for these renewable energy technologies to supply this demand, power electronic devices need to be able to handle this increased demand.

Currently, power inverters are used in parallel (e.g., connected such that electrical current flows through all inverters simultaneously) to accommodate the high power/current demand for electrical energy in power grids. When inverters are used in parallel to allow parallel power generation, such a configuration is often referred to as load sharing or power sharing. Droop control is a control strategy commonly applied to power generators to allow load sharing. This strategy allows for equal load balancing between inverters, but requires that output impedances be matched between the inverters. This results in inaccurate reactive power sharing—an important aspect of power sharing performance. Traditional droop control strategies are also unable to handle system disturbances, such as large or quick load changes, variations in output impedances, and fluctuating DC-link voltages.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is therefore one aspect of the disclosed embodiments to provide for an improved droop control method and system.

It is another aspect of the disclosed embodiments to provide for a control device, system, and method for parallel operated inverters to achieve accurate proportional load sharing.

It is another aspect of the disclosed embodiments to provide for an improved droop control strategy capable of handling system disturbances while allowing for accurate proportional load sharing among parallel-operated inverters.

It is yet another aspect of the disclosed embodiments to provide for a reactive power reference for the regulation of reactive power and the incorporation of a UDE (Uncertainty and Disturbance Estimator) for reactive power sharing.

The aforementioned aspects and other objectives and advantages can now be achieved as described herein. A control system and method include a control strategy and a UDE (Uncertainty and Disturbance Estimator)-based controller incorporated into the control strategy. The UDE-based controller regulates the reactive power against the output generated by a reactive power reference unit according to the load voltage to generate the amplitude of the control voltage.

The conventional droop method is adopted to regulate the real power for real power sharing, wherein the phase of the control voltage is generated.

Both the amplitude and the phase of the control voltage form the final control outputs for parallel operated inverters to achieve desired load sharing or power sharing performance.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the disclosed embodiments, serve to explain the principles of the present invention.

DETAILED DESCRIPTION

Figure 1:
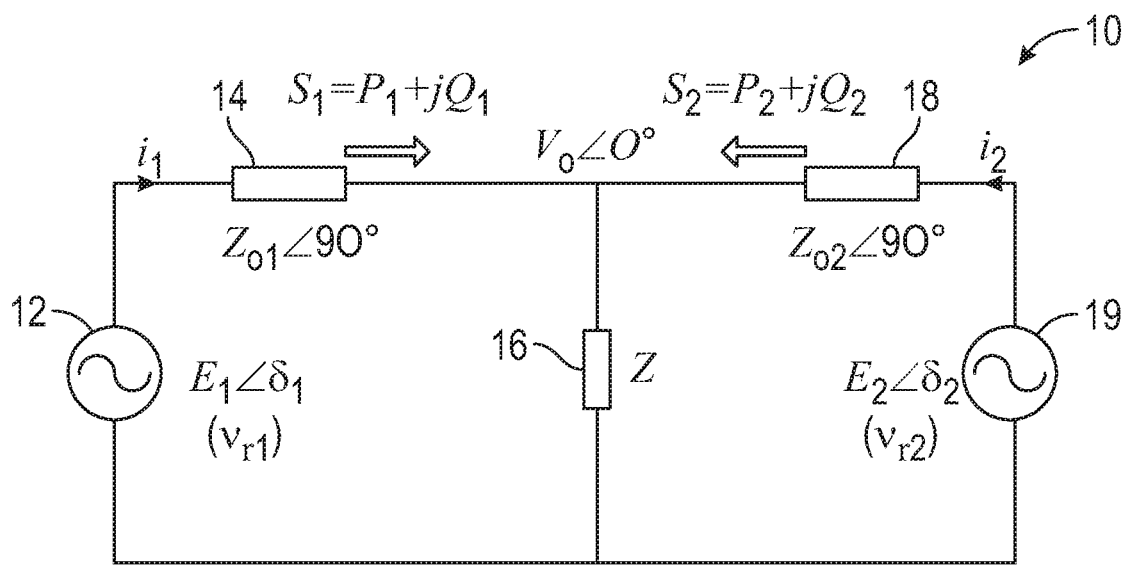
FIG. 1 illustrates a schematic diagram of a prior art circuit having two parallel operated inverters with inductive output impedance.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to identical, like or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or" as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Renewable energies, such as wind energy, solar energy, wave and tidal energy, are growing very fast nowadays. Moreover, fuel cell and battery electric vehicles can be treated as renewable energies when they are connected to the grid through the vehicle-to-grid mode. Normally, power inverters are adopted in these applications, which are also known as distributed generations, to interface with the utility grid or the microgrid. However, with the growing capacity of renewable energies, such as MW-level wind turbines, and large-scale wind/solar farms, the power electronic devices face big challenges with the needs of high current and high power. Then several power inverters are required in parallel operation due to the current limitation or cost limitation of power electronic devices. Another reason for the need of parallel operation of inverters is to provide system redundancy and high reliability from the requirements of critical customers.

Power sharing based on droop characteristics is widely used in parallel operation of inverters. Also, sharing the load among distributed generations is popular for the operation of islanded microgrid. One major advantage of the droop control is that no external communication mechanism is needed among the parallel inverters, which gives significant flexibility without the interdependency of the local controllers for the balance between power generations and the demands. Another advantage is that the system inherits the "plug and play" feature without changing the control strategies of parallel units. However, the conventional droop control is not able to achieve accurate reactive power sharing among parallel units due to the mismatched output impedance, and presents poor transient performance. Also system disturbances, e.g., large or fast change of the load, variations of output impedance, and fluctuating DC-link voltage, often affect the load sharing performance.

The virtual impedance is a widely used approach to improve power sharing performance among parallel operated inverters. Adding a virtual inductor and estimating the effect of the line impedance may improve the sharing performance via changing the droop coefficients. The complex virtual impedance can be designed to minimize the fundamental and harmonic circulating currents in the parallel system. The communication and adaptive virtual impedance can be combined to enhance the accuracy of reactive power sharing, and the time delay problem in communication may be improved. An accurate power sharing can be realized by regulating the virtual impedance at fundamental positive sequence, fundamental negative sequence, and harmonic frequencies. However, the sharing performance of virtual impedance based method will be affected by the variations of the output filter components. With the introduction of virtual impedance, the output voltages of inverters are sensitive to the harmonic currents.

A number of methods have been proposed for sharing the load. For example, injecting a harmonic voltage according to the output harmonic current may be used for improving the total harmonic current sharing, and power sharing may be achieved as well. A small signal injection method has been proposed to improve the accuracy of the reactive power sharing. A Q-V dot droop control method has also been proposed to improve the accuracy of reactive power sharing following the idea of changing the droop coefficients. In addition, a virtual flux droop method has been proposed, which involves drooping the virtual flux instead of the voltage to achieve real power and reactive power sharing with low-frequency deviation. The voltage droop strategy has also been redesigned to deal with mismatched output impedance for power sharing. Especially, the robust droop control introduces an integrator to enhance the robustness of droop control to achieve accurate proportional load sharing.

It is worth noting that the hierarchical droop control is another method and trend that attempts to cope with the disadvantages of conventional droop control through communication among parallel operated inverters. In hierarchical control methods, the primary control is the droop control method, and voltage and frequency deviations are compensated by the secondary control through communication. However, hierarchical droop control also has its own drawbacks, such as the cost of communication, reliability, location, and slow responses.

The disclosed embodiments thus disclose a new droop control strategy based on a UDE (Uncertainty and Disturbance Estimator) method for parallel operated inverters to achieve accurate proportional load sharing, particularly for reactive power sharing. The UDE control algorithm is based on the assumption that the uncertainty and disturbances can be estimated using a filter with the appropriate bandwidth.

In the disclosed embodiments, for reactive power sharing, the reactive power dynamics is developed from the equation of power delivering passed through a low-pass filter. The load voltage is fed back to generate the reactive power reference for the design of the UDE-based controller, which helps achieve accurate sharing control of reactive power. With the adoption of the UDE-based control method, the reactive power sharing can be achieved in the presence of model nonlinearity and uncertainties (e.g., parameter drifts and uncertain output impedance) and system disturbances (e.g., fluctuating DC-link voltage and load change). For real power sharing, the conventional droop control method is adopted for the frequency regulation, as it can achieve accurate proportional real power sharing. The effectiveness of the proposed control method is investigated by theoretical analysis and demonstrated through experimental studies on an experimental test rig, which consists of two parallel operated power inverters from Texas Instruments (TI).

FIG. 1 illustrates a schematic diagram of a prior art circuit 10 having two parallel operated inverters 12 and 19 with two individual inductive output impedances 14 and 18 to support a common load 16 (i.e., Z).

Figure 2:
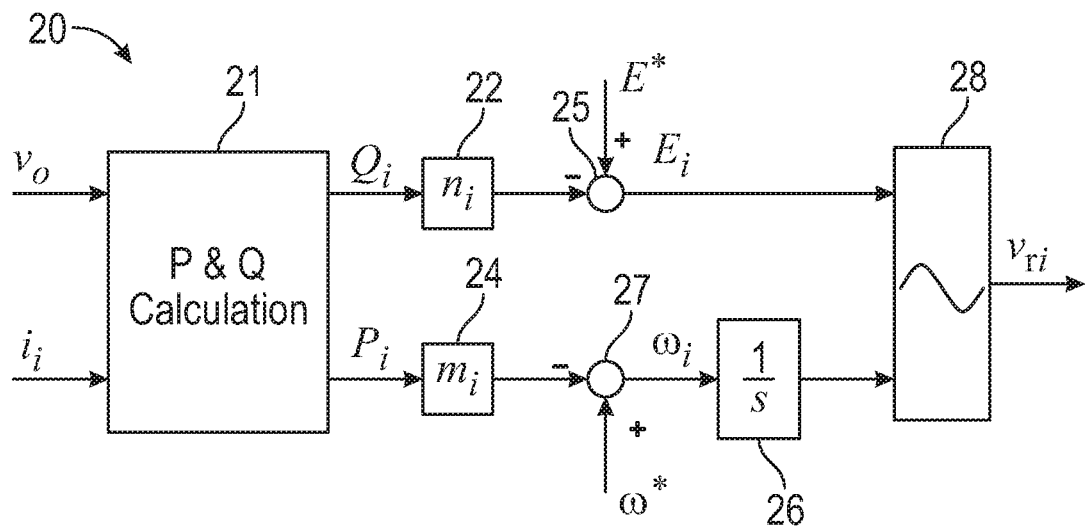
FIG. 2 illustrates a block diagram of a prior art droop control strategy.

FIG. 2 illustrates a block diagram of a prior art droop control strategy 20 with a power component 21 for the calculation of P (Real Power) and Q (Reactive Power) labeled in FIG. 2 as "P&Q calculation." The outputs from the P&Q calculation component 21 are fed as inputs to droop coefficient components 22 and 24 (i.e., parameters $n_i$ and $m_i$ are the droop coefficients, which are related to the capacity of the inverters) for both reactive power and real power channels, respectively. Output from the components 22 and 24 are respectively fed to summation components 25 and 27 to form the amplitude and the phase of the control voltage for a sinusoidal control output component 28, wherein the phase of the control voltage is generated by summation components 27 passing through an integral component 26.

When a single inverter $E \angle \delta$ delivers power to the grid $V_o \angle 0°$ through an impedance $Z_o \angle \theta$, the real power P and the reactive power Q received by the grid $V_o \angle 0°$ are shown in equations (1) and (2) as follows:

$$P = \left(\frac{EV_o}{Z_o}\cos\delta - \frac{V_o^2}{Z_o}\right)\cos\theta + \frac{EV_o}{Z_o}\sin\delta\sin\theta \quad (1)$$

$$Q = \left(\frac{EV_o}{Z_o}\cos\delta - \frac{V_o^2}{Z_o}\right)\sin\theta - \frac{EV_o}{Z_o}\sin\delta\cos\theta \quad (2)$$

where $\delta$ is the phase difference between the inverter and the grid, often called the power angle.

Usually, because of the output inductor or the inductance of the line impedance, the output impedance of an inverter is mostly inductive. In this case, with $\theta=90°$ the power delivery equations (1) and (2) can be reduced as follows as shown in equations (3) and (4):

$$P = \frac{EV_o}{Z_o}\sin\delta \quad (3)$$

$$Q = \frac{EV_o}{Z_o}\cos\delta - \frac{V_o^2}{Z_o} \quad (4)$$

For the conventional droop control, $\delta$ is assumed to be small. Then, $$P \approx \frac{EV_o}{Z_o}\delta \text{ and } Q \approx \frac{EV_o}{Z_o} - \frac{V_o^2}{Z_o}$$

and roughly, P~$\delta$ and Q~E, where ~ means "in proportion to." As a result, the conventional droop controller for parallel operated inverters as shown in FIG. 1 can be represented as shown in equations (5) and (6) below:

$$E_i = E^* - n_i Q_i \quad (5)$$

$$\omega_i = \omega^* - m_i P_i \quad (6)$$

where $E_i$ is the voltage set-point, $\omega_i$ is the frequency set-point, $E^*$ is the rated voltage and $\omega^*$ is the rated frequency. The parameters $n_i$ and $m_i$ are the droop coefficients, which are related to the capacity of the inverters, and usually defined by the requirement of customers. The block diagram of this conventional droop control is shown in FIG. 2.

The limitations of conventional droop control with mismatched output impedances are demonstrated by equations (7) and (8) below. For example, in order to hold the proportional reactive power sharing $$n_i Q_i = n_j Q_j \quad (7)$$

all parallel operated inverters should have the same per-unit output impedance in the steady state:

$$\frac{z_{oi}}{n_i} = \frac{z_{oj}}{n_j} \quad (8)$$

where i and j represent all parallel units. This is a very strict condition for inverter design, requiring careful matching of components, for conventional droop control. Moreover, the output impedance of an inverter always drifts in different conditions, such as, for example, inductance change with magnetic saturation caused by high current, and resistance change by high temperature. Other disadvantages of conventional droop control, such as poor transient performance and bad regulation capability are known.

In addition, for conventional droop control, as shown in equations (5) and (6), it is worth noting that the nonlinearity of the equations (1) and (2) of power delivery is approximately linearized based on the assumption that the output impedance of the inverter is purely inductive. As mentioned before, the system disturbances, variations of output impedance, and fluctuating DC-link voltage will affect the sharing performance of parallel operated inverters. The disclosed embodiments, therefore overcome these drawbacks with a control strategy that does not rely on these assumptions but which can cope with these effects.

As will be discussed in greater detail herein, the disclosed embodiments generally include two distinct parts: the reactive power regulation for reactive power sharing, and the real power regulation for real power sharing. For the reactive power sharing, the reactive power dynamics is generated through the reactive power passing by a low-pass filter, the reactive power reference is generated by the drop of load voltage, and the incorporation of a uncertainty and disturbance estimator (UDE) achieves reactive power regulation. For the real power sharing, conventional droop control method is adopted by adding a low-pass filter. Specifically, both disclosed low-pass filters can be the first-order low-pass filters. The additional purpose of such filters is to reduce high-frequency noise frequencies that occur during the switching of harmonics and sampling disturbances.

The UDE integration of reactive power control involves three parts: the generation of the reactive power dynamics from the low-pass filter, the reactive power regulation with UDE-based control, and the generation of the reactive power reference from load voltage droop.

With the choice of a first-order low-pass filter $$G_{qi}(s) = \frac{1}{1+\tau_{gi}s},$$

where $\tau_{qi}$ is the time constant, the reactive power from (4) can be re-written as $$Q_i = \frac{1}{1+\tau_{gi}s} \cdot \left( \frac{E_i V_o}{Z_{oi}} \cos\delta_i - \frac{V_o^2}{Z_{oi}} \right)$$

or, in the time-domain, as $$\dot{Q}_i = \frac{E_i V_o}{\tau_{qi} Z_{oi}} \cos\delta_i - \frac{V_o^2}{\tau_{qi} Z_{oi}} - \frac{Q_i}{\tau_{qi}}. \tag{9}$$

Since the power angle $\delta_i$ depends on the load and the inverters in parallel operation, which is quite uncertain, the reactive power dynamics (9) can be re-written as indicated by equation (10) below $$\dot{Q}_i = \frac{V_o}{\tau_{qi} Z_{oi}} E_i - \frac{V_o^2}{\tau_{qi} Z_{oi}} - \frac{Q_i}{\tau_{qi}} + \Delta_{qi} \tag{10}$$

where $$\Delta_{qi} = \frac{E_i V_o}{\tau_{qi} Z_{oi}}(\cos\delta_i - 1) \tag{11}$$

represents the lumped uncertain term, including the nonlinearity and uncertainty of the power angle.

Figure 3:
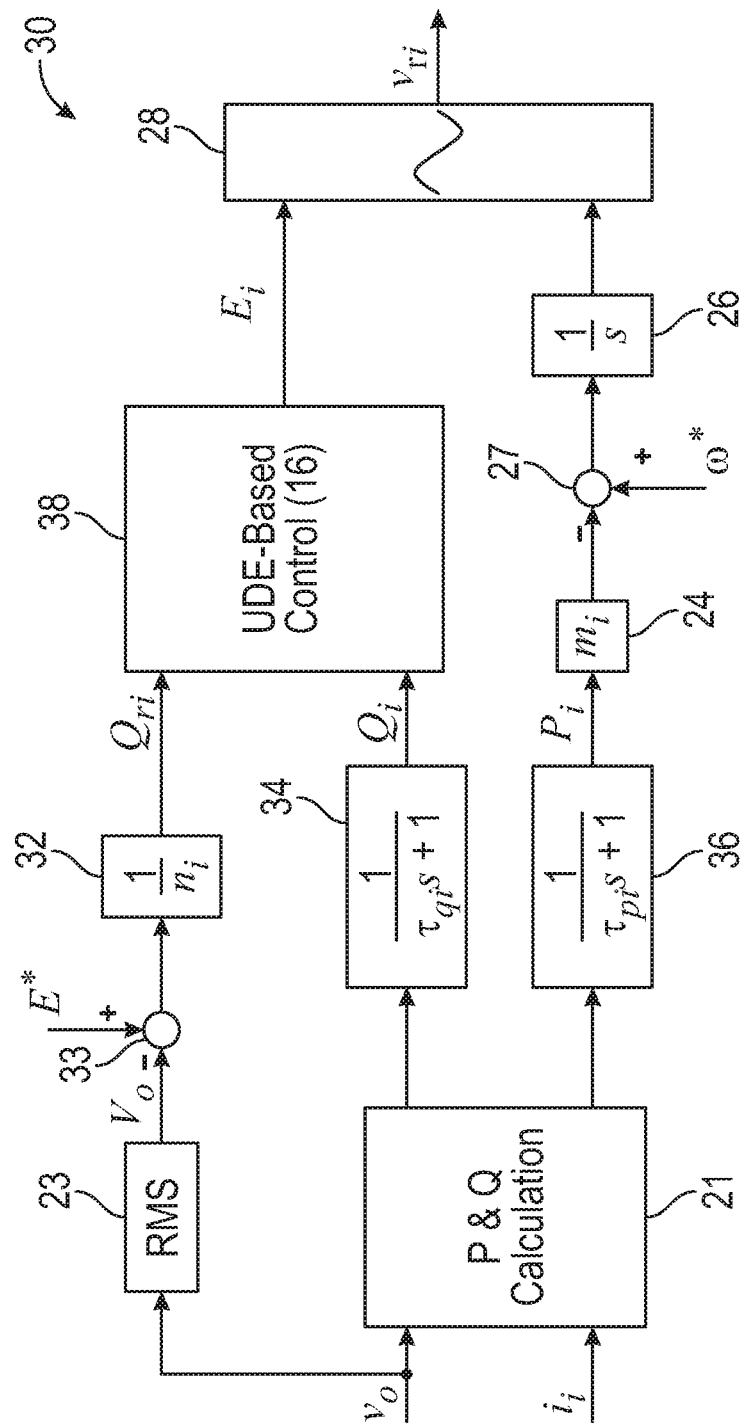
FIG. 3 illustrates a block diagram depicting a UDE-based robust droop control strategy, in accordance with an example embodiment.

FIG. 3 illustrates a block diagram of a UDE-based robust droop control strategy 30, in accordance with an example embodiment. In general, the UDE-based robust droop control strategy 30 includes two control channels. In reactive power regulation channel, the reactive power $Q_i$ is calculated from a P&Q calculation component 21 passing by a low-pass filter $G_{qi}(s)$ 34, the reactive power reference $Q_{ri}$ is generated from feedback load voltage $v_o$ passing by an RMS (Root Mean Square) component 23 that calculates an RMS voltage, and voltage droop calculation with a summation component 33 and droop coefficient $$\frac{1}{n_i}$$

component 32. Central to the reactive power regulation channel is the implementation of a UDE-based controller 38 that is based on a mathematical controls engineering model as discussed herein in further detail with respect to equation (16). In real power regulation channel, the real power $P_i$ is calculated from the same P&Q calculation component 21 passing by a low-pass filter $G_{pi}(s)$ 36. The real power is regulated with a droop coefficient $m_i$ component 24, a summation component 27, and an integral component 26. The amplitude and the phase of the control voltage to form a sinusoidal control output component 28 are outputs from the components 38 and 26, respectively.

FIG. 3 thus illustrates a block diagram depicting a control strategy 30 offering a UDE-based robust droop control algorithm, in accordance with an example embodiment. The disclosed embodiments offer a new droop control strategy based on a UDE method for parallel operated inverters. For the reactive power sharing, the UDE-based method can be adopted to deal with nonlinearity, uncertainty and system disturbances. For real power sharing, the conventional droop control method can be adopted with the change of adding a low-pass filter.

Note that with the reactive power dynamics developed in equation (10), the reactive power control is developed for reactive power sharing with the control objective that the output reactive power of parallel operated inverters $Q_i$ asymptotically tracks the reactive power reference $Q_{ri}$ as shown in FIG. 3. The tracking error $$e_{qi} = Q_{ri} - Q_i \tag{12}$$

satisfies the desired dynamic equation $$\dot{e}_{qi} = -K_{qi} e_{qi}, \tag{13}$$

where $K_{qi} > 0$ is a constant error feedback gain.

Combing (10), (12) and (13), the $E_i$ needs to satisfy $$E_i = \frac{\tau_{qi} Z_{oi}}{V_o} \left( \dot{Q}_{ri} + \frac{V_o^2}{\tau_{qi} Z_{oi}} + \frac{Q_i}{\tau_{qi}} + K_{qi} e_{qi} - \Delta_{qi} \right). \tag{14}$$

According to the system dynamics set forth in equation (10), the uncertain term $\Delta_{qi}$ defined in (11) can be represented as:

$$\Delta_{qi} = \dot{Q}_i - \frac{V_o}{\tau_{qi} V_{oi}} E_i + \frac{V_o^2}{\tau_{qi} Z_{oi}} + \frac{Q_i}{\tau_{qi}}.$$

According to the procedures of the disclosed UDE method, the term $\Delta_{qi}$ can be estimated according to equation (15) as follows:

$$\hat{\Delta}_{qi} = \Delta_{qi} * g_{fi} = \left( \dot{Q}_i - \frac{V_o}{\tau_{qi} Z_{oi}} E_i + \frac{V_o^2}{\tau_{qi} Z_{oi}} + \frac{Q_i}{\tau_{qi}} \right) * g_{fi}, \quad (15)$$

where $g_{fi}(t)$ is the impulse response of a strictly proper stable filter $G_{fi}(s)$ with the appropriate bandwidth. In addition, in equation (15) above "*" represents the convolution operator. The UDE filter has a flexible design to cope with different kinds of disturbances to achieve different performance. Replacing $\Delta_{qi}$ with $\hat{\Delta}_{qi}$ in (14) results in the following formulation:

$$E_i = \frac{\tau_{qi} Z_{oi}}{V_o} \left[ \dot{Q}_{ri} + \frac{V_o^2}{\tau_{qi} Z_{oi}} + \frac{Q_i}{\tau_{qi}} + K_{qi} e_{qi} - \left( \dot{Q}_i - \frac{V_o}{\tau_{qi} Z_{oi}} E_i + \frac{V_o^2}{\tau_{qi} Z_{oi}} + \frac{Q_i}{\tau_{qi}} \right) * g_{fi} \right]$$

Then, the disclosed UDE-based controller is based on a mathematical controls engineering model as follows:

$$E_i = \frac{\tau_{qi} Z_{oi}}{V_o} \left[ \frac{V_o^2}{\tau_{qi} Z_{oi}} + \frac{Q_i}{\tau_{qi}} + L^{-1} \left\{ \frac{1}{1 - G_{fi}(s)} \right\} * (\dot{Q}_{ri} + K_{qi} e_{qi}) - L^{-1} \left\{ \frac{s G_{fi}(s)}{1 - G_{fi}(s)} \right\} * Q_i \right]. \quad (16)$$

Although the parameter $V_o$ appears in the denominator in equation (16), the initial singularity problem can be avoided by setting a non-zero initial value for $V_o$.

Note that in the aforementioned controller design, the reactive power reference $Q_{ri}$ may be required for reactive power sharing. Instead of drooping the voltage set-point $E_i$, the load voltage $V_o$ should be drooped. This idea can be applied to change the voltage droop in equation (5), the reactive power reference is generated as shown in FIG. 3 as indicated by equation (17) below:

$$Q_{ri} = \frac{E^* - V_o}{n_i} \quad (17)$$

It is worth noting that the similar idea of load-voltage feedback can be implemented in some implementations for improving the conventional droop control via directly re-designing the voltage droop strategy. However, here the feedback of load voltage can be used to generate the reactive power reference, which is different from these other implementations.

Regarding the performance analysis of reactive power sharing, consider the parallel operated inverts with reactive power dynamics of equation (1), the UDE-based robust drop control of equation (16), the reactive power reference of equation (17), and the performance of reactive power sharing. When the estimated term $\hat{\Delta}_{qi}$ (see equation (15)) is adopted to replace $\Delta_{qi}$ in equation (14), the error dynamics from equation (13) becomes the following, as set forth in equation (18):

$$\dot{e}_{qi} = -K_{qi} e_{qi} - \tilde{\Delta}_{qi}, \quad (18)$$

where $$\tilde{\Delta}_{qi} \triangleq \Delta_{qi} - \hat{\Delta}_{qi}$$

is the estimated error of the uncertain term. According to equation (15), the estimated error is as follows as shown in equation (19)

$$\tilde{\Delta}_{qi} = \Delta_{qi} * L^{-1} \{1 - G_{fi}(s)\}. \quad (19)$$

By substituting equation (19) into equation (18) and taking the Laplace transformation, $$sE_{qi}(s) = -K_{qi} E_{qi}(s) - \blacktriangle_{qi}(s)[1 - G_{fi}(s)], \quad (20)$$

where $E_{qi}(s)$ and $\blacktriangle_{qi}(s)$ are the Laplace transform of $e_{qi}$ and $\Delta_{qi}$, respectively. Then, $$E_{qi}(s) = -\frac{\blacktriangle_{qi}(s)[1 - G_{fi}(s)]}{s + K_{qi}}. \quad (21)$$

Note that $\Delta_{qi}$ in equation (11) is normally small because $\delta_i$ is often too close to 1 and it can be assumed bounded. In other words, $$\lim_{s \to 0} s \cdot \blacktriangle_{qi}(s) < \infty.$$

Since the filter $G_{fi}(s)$ is designed to be a strictly-proper stable filter with $G_{fi}(0)=1$, by applying the final value theorem to equation (21), there is $$\lim_{t \to \infty} e_{qi} = \lim_{s \to 0} s \cdot E_{qi}(s) \quad (22)$$
$$= \lim_{s \to 0} \frac{s \cdot \blacktriangle_{qi}(s)[1 - G_{fi}(s)]}{s + K_{qi}}$$
$$= 0.$$

The tracking error of the reactive power control converges to zero, then $$Q_i = Q_{ri} = \frac{E^* - V_0}{n_i}.$$

As a result, the condition for accurate reactive power sharing $$n_i Q_i = n_j Q_j = E^* - V_0$$

is satisfied because both $E^*$ and $V_o$ are the same for all parallel units. This condition is not affected by the uncertainty in the output impedance, so accurate reactive power sharing can be achieved even when the per-unit output impedance of the inverters are not the same. The uncertainties/variations in output impedance (e.g., caused by parasitic resistance and filter capacitor, by high current, or by high temperature) can be lumped into the uncertain term $\Delta_{qi}$ in equation (11), which can then be estimated and compensated by the UDE-based control law (see equation (16)). The load change will affect the power angle, but it can be lumped into the uncertain term $\Delta_{qi}$ in equation (11), and be compensated. As a result, this UDE-based robust droop control from equation (16) can also handle the disturbance of load change and achieve automatic power balance between the load and inverter units Furthermore, a PWM modulation unit can be applied in the final controller output $v_{ri}$ shown in FIG. 3 for the control of power electronic devices to convert DC power to AC power, which introduces the disturbances of fluctuating DC-link voltage into the system. The variations of the DC-link voltage can also be treated as external disturbances and handled by the UDE-based robust droop control shown in equation (16). There is no need to measure the DC-link voltage, as long as the DC-link voltage is high enough to deliver power to the grid. In practice, the DC-link voltage can be measured for other purposes, e.g., protection.

Compared with the conventional droop control of equation (5), the UDE-based robust droop control of equation (16) introduces some extra control parameters, error feedback gain in equation (13), and the UDE filter in equation (15), to enhance the transient performance of reactive power sharing for parallel operated inverters.

In practice, an inner-loop current controller can be added into the controller output $v_{ri}$ in FIG. 3 with other purposes, such as harmonic improvement with virtual impedance design and current protection. The added virtual impedance, however, will not affect the sharing performance with the proposed embodiments.

For real power sharing, the conventional droop control of equation (6) with a first-order low-pass filter is adopted as it can achieve accurate proportional sharing for real power. In the disclosed embodiments, the first-order low-pass filter $$G_{pi}(s) = \frac{1}{\tau_{pi}s + 1}$$

is applied for the real power calculation with the time constant $\tau_{pi}$, which filters out the high-frequency noises, such as switching harmonics and sampling disturbances.

The frequency regulation in equation (6) can be written as $$m_i P_i = \omega^* - \omega_i.$$

When the system is in the steady state, all parallel operated inverters are working under the same frequency. Then $$m_i P_i = m_j P_j$$

is easily achieved with the same $w_i$ for all parallel units, which guarantees accurate real power sharing.

Figure 4A:
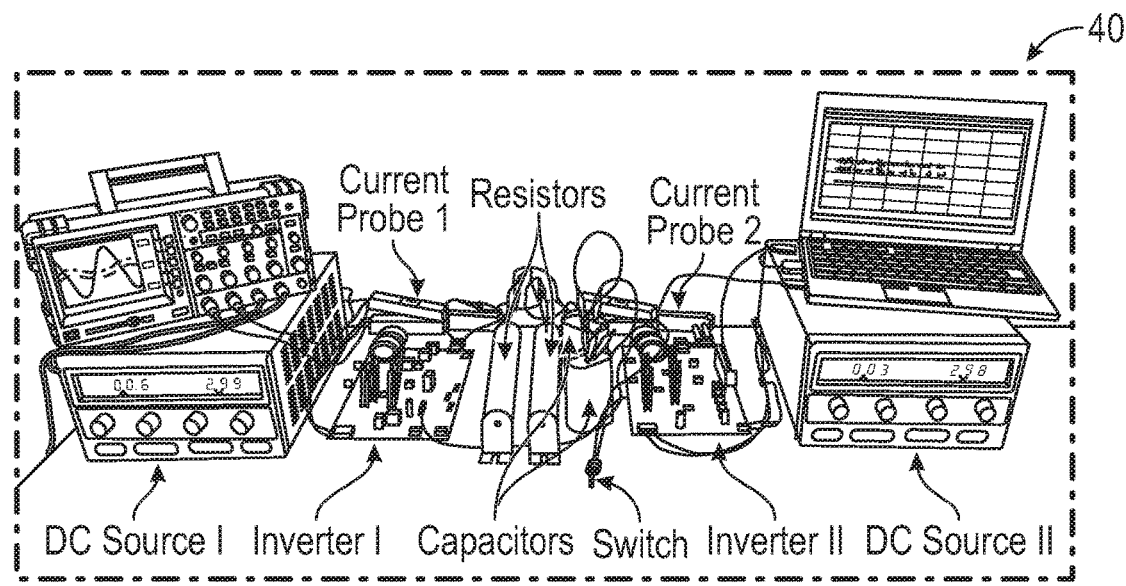
FIG. 4A and FIG. 4B respectively illustrate a pictorial diagram of an experimental setup and its circuit diagram, in accordance with an example embodiment.
Figure 4B:
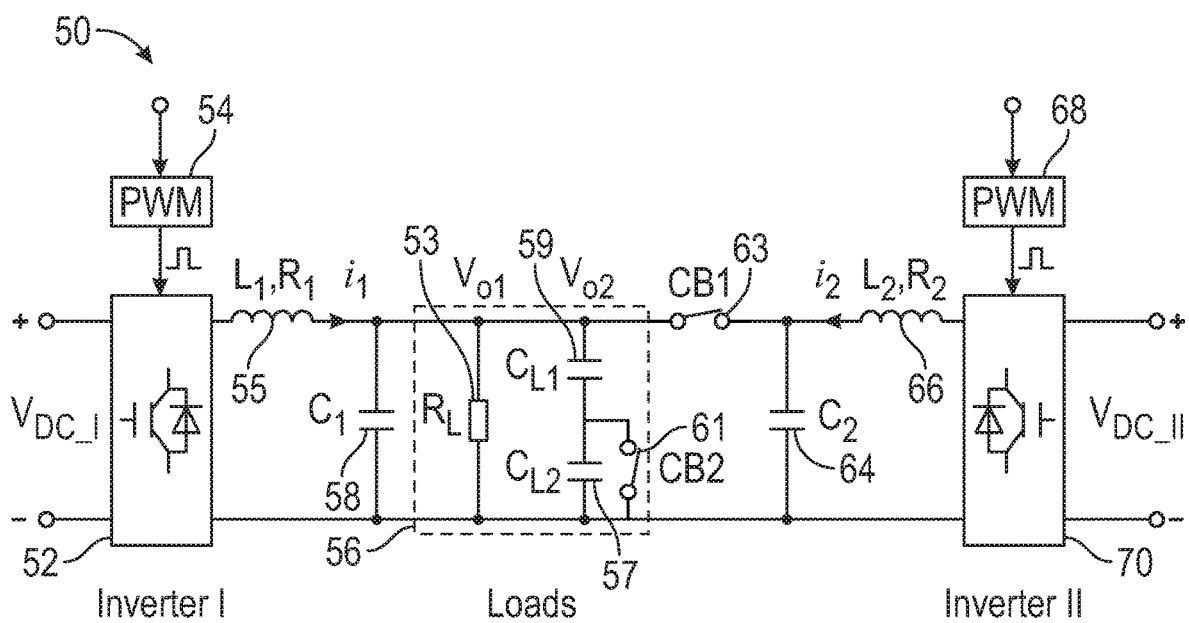
Figure 5A:
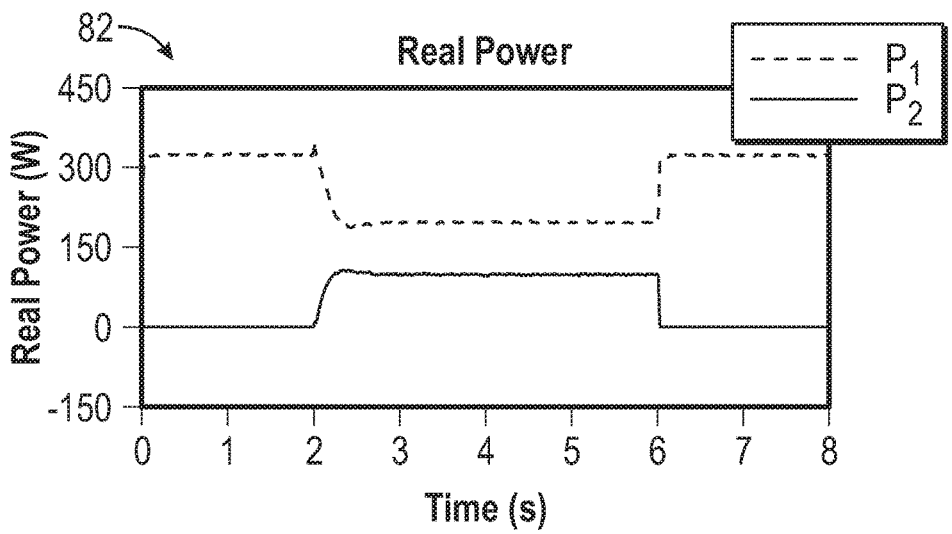
FIGS. 5A-5F illustrate a group of graphs depicting nominal experimental results for power sharing performance, in accordance with example embodiments.
Figure 5B:
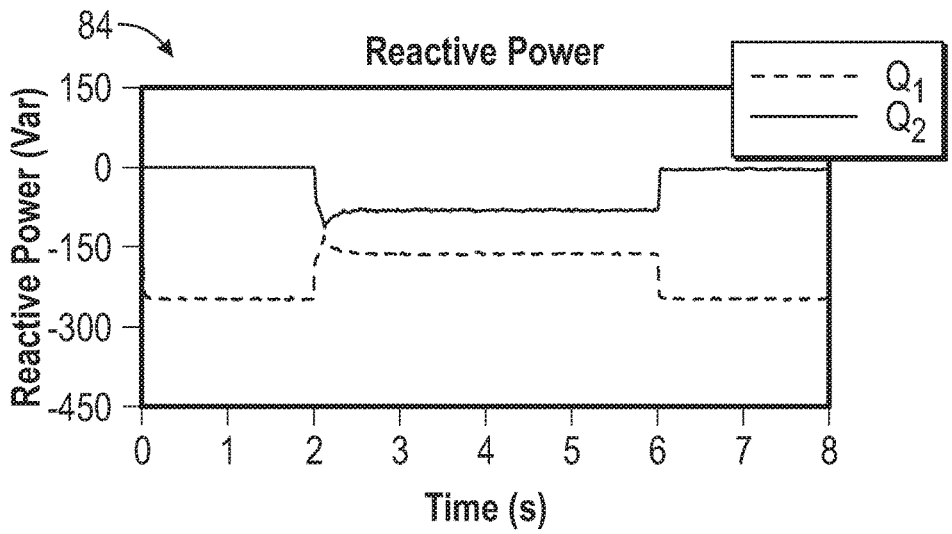
Figure 5C:
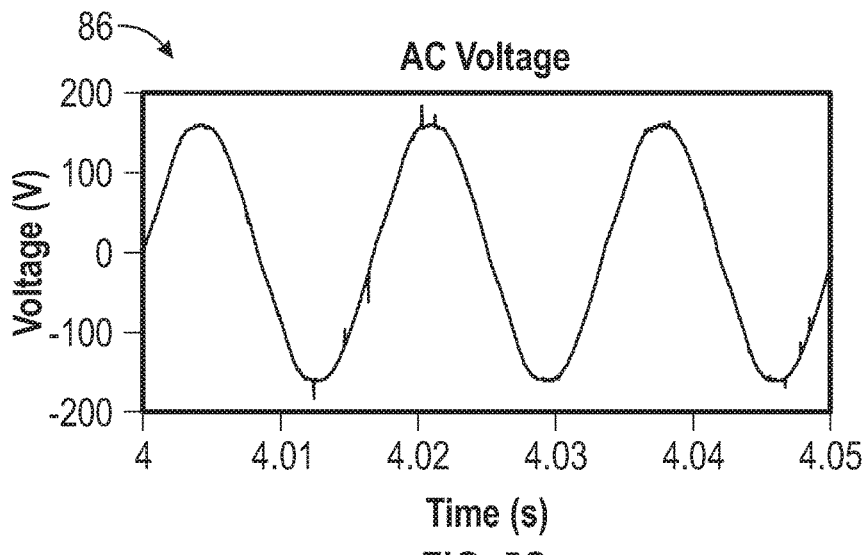
Figure 5D:
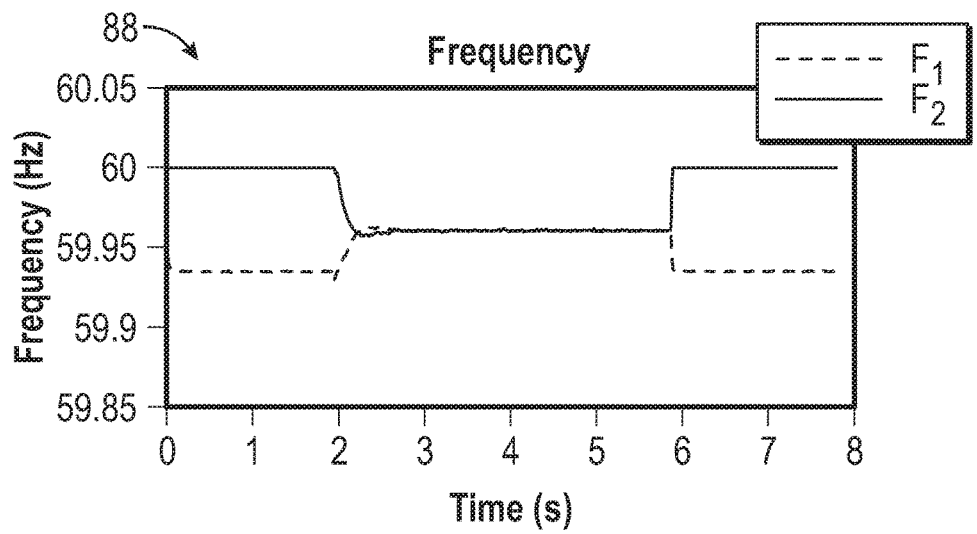
Figure 5E:
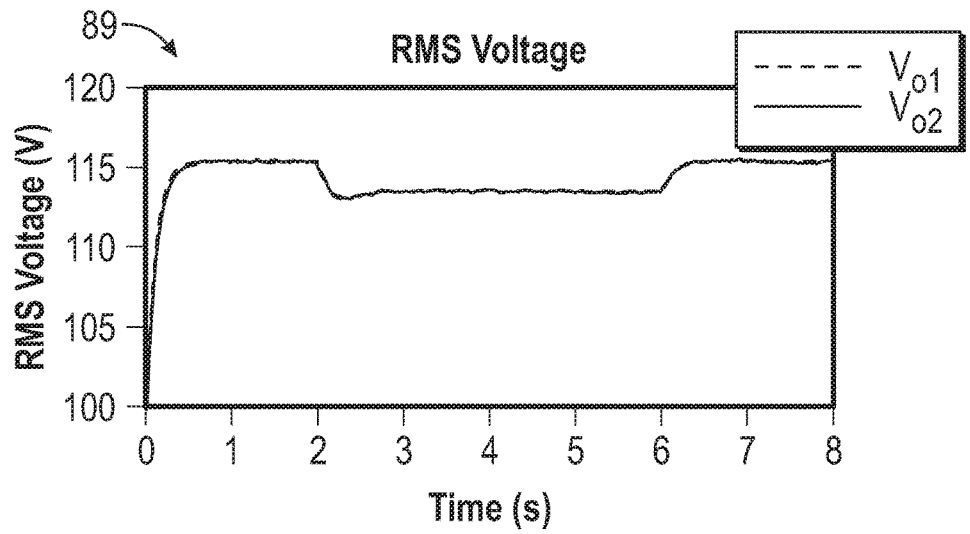
Figure 5F:
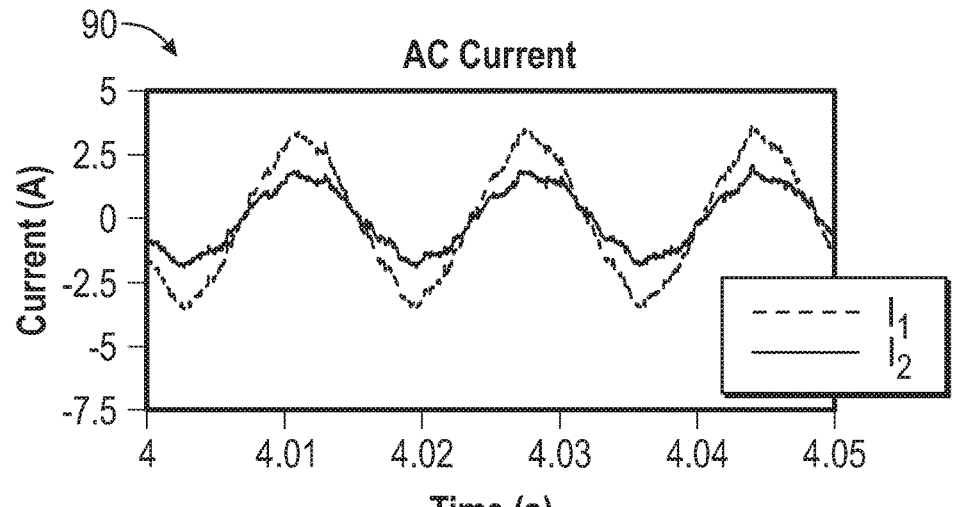
Figure 6A:
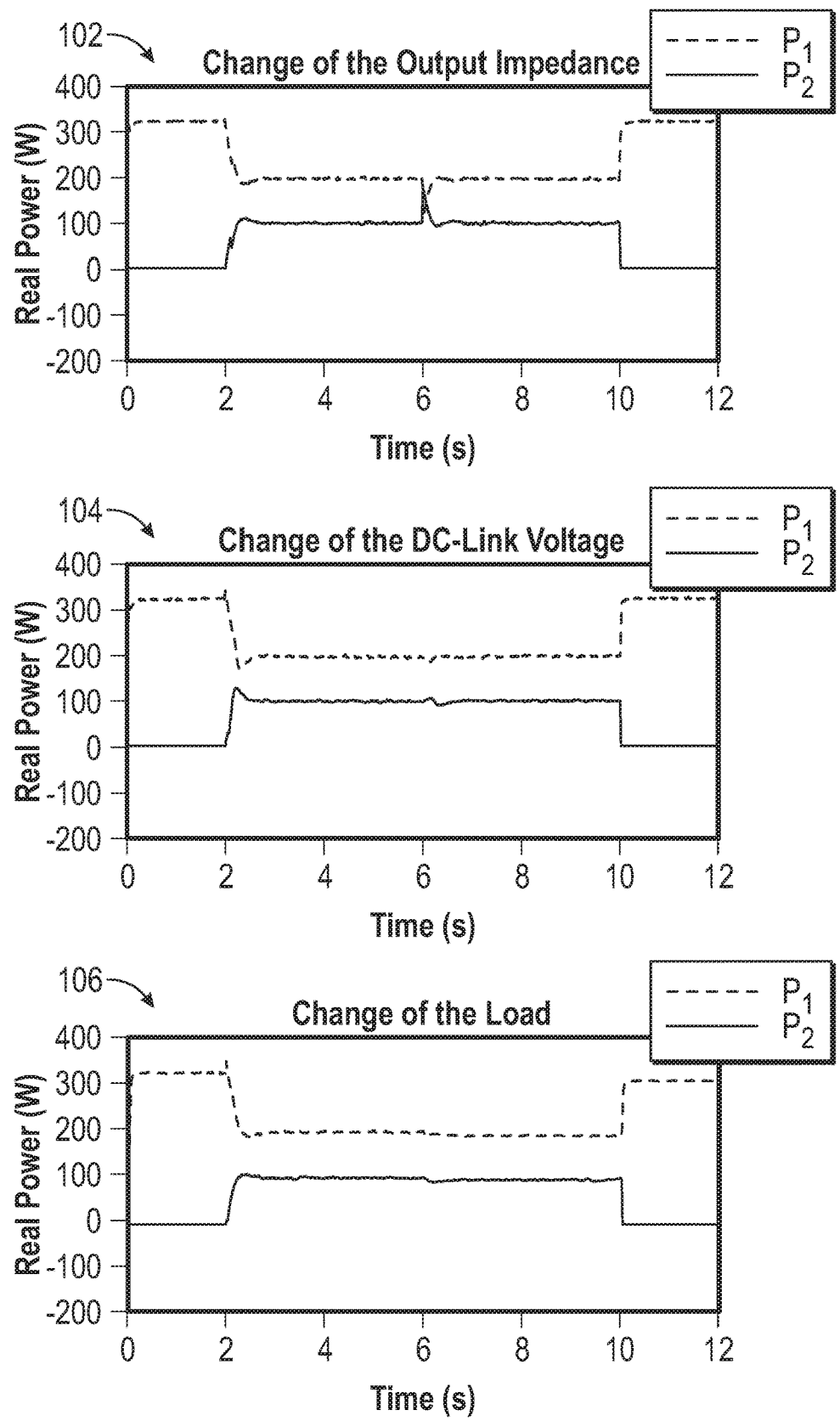
FIGS. 6A-6D illustrate a group of graphs depicting transient experimental results under different scenarios, in accordance with example embodiments.
Figure 6B:
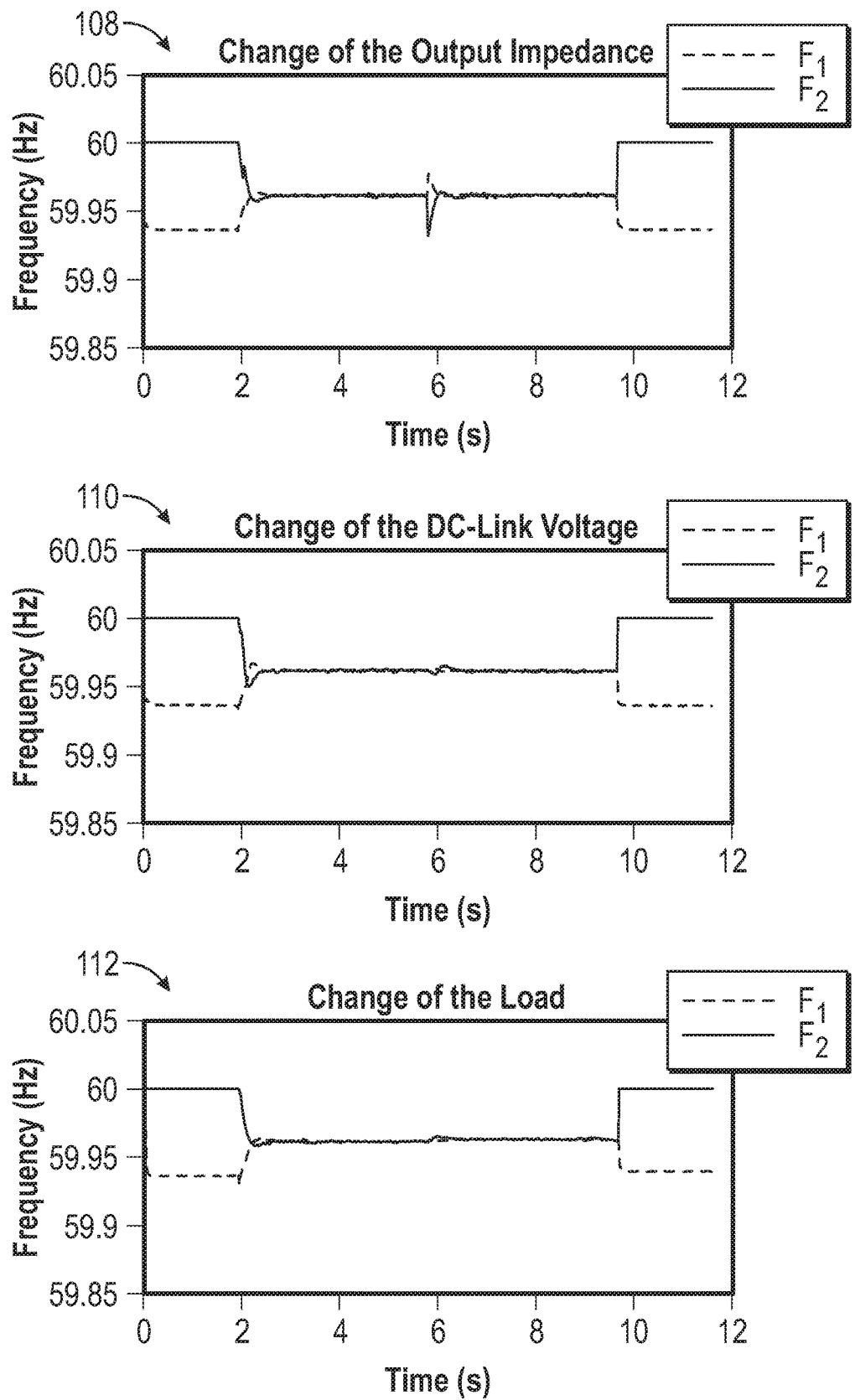
Figure 6C:
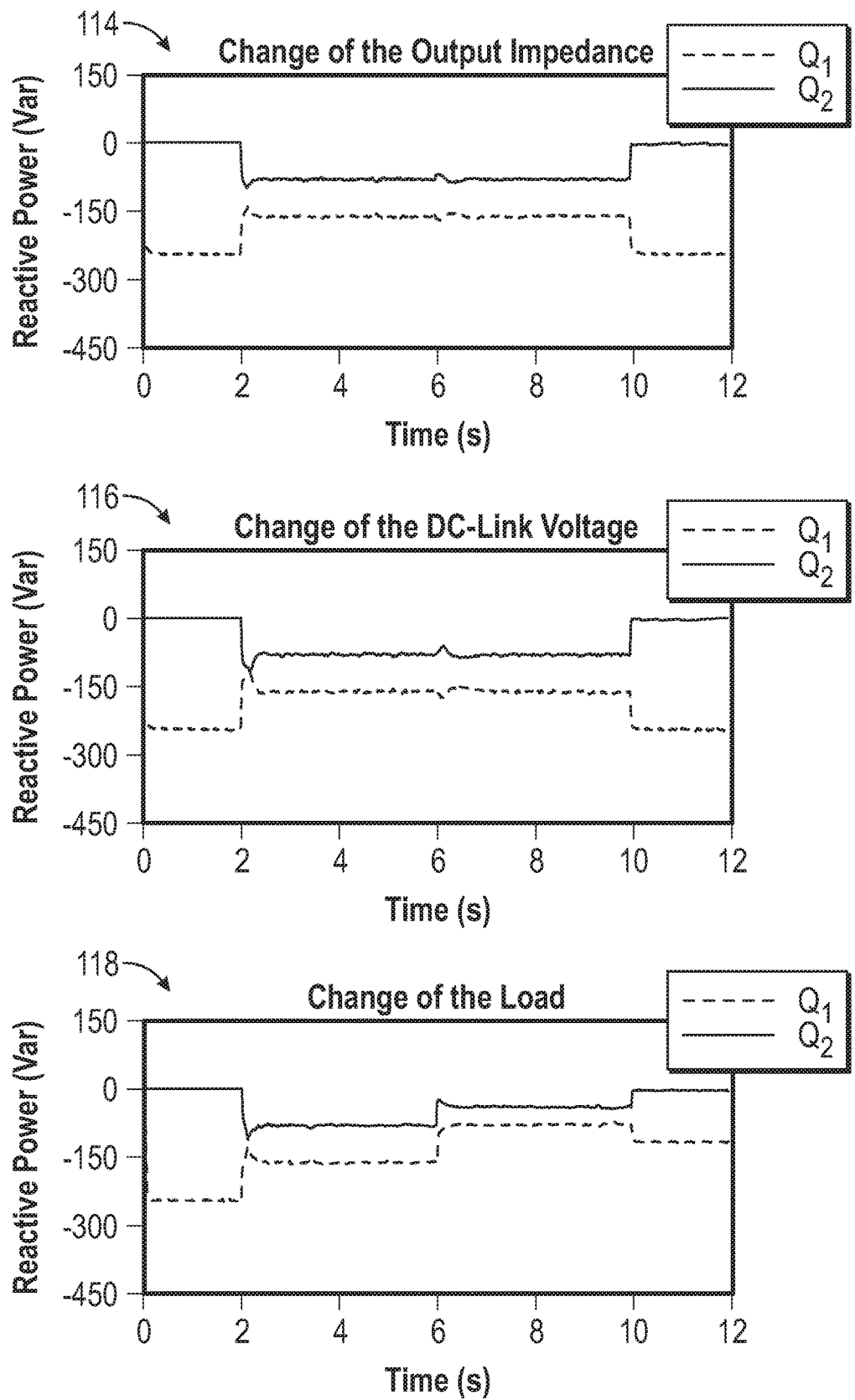
Figure 6D:
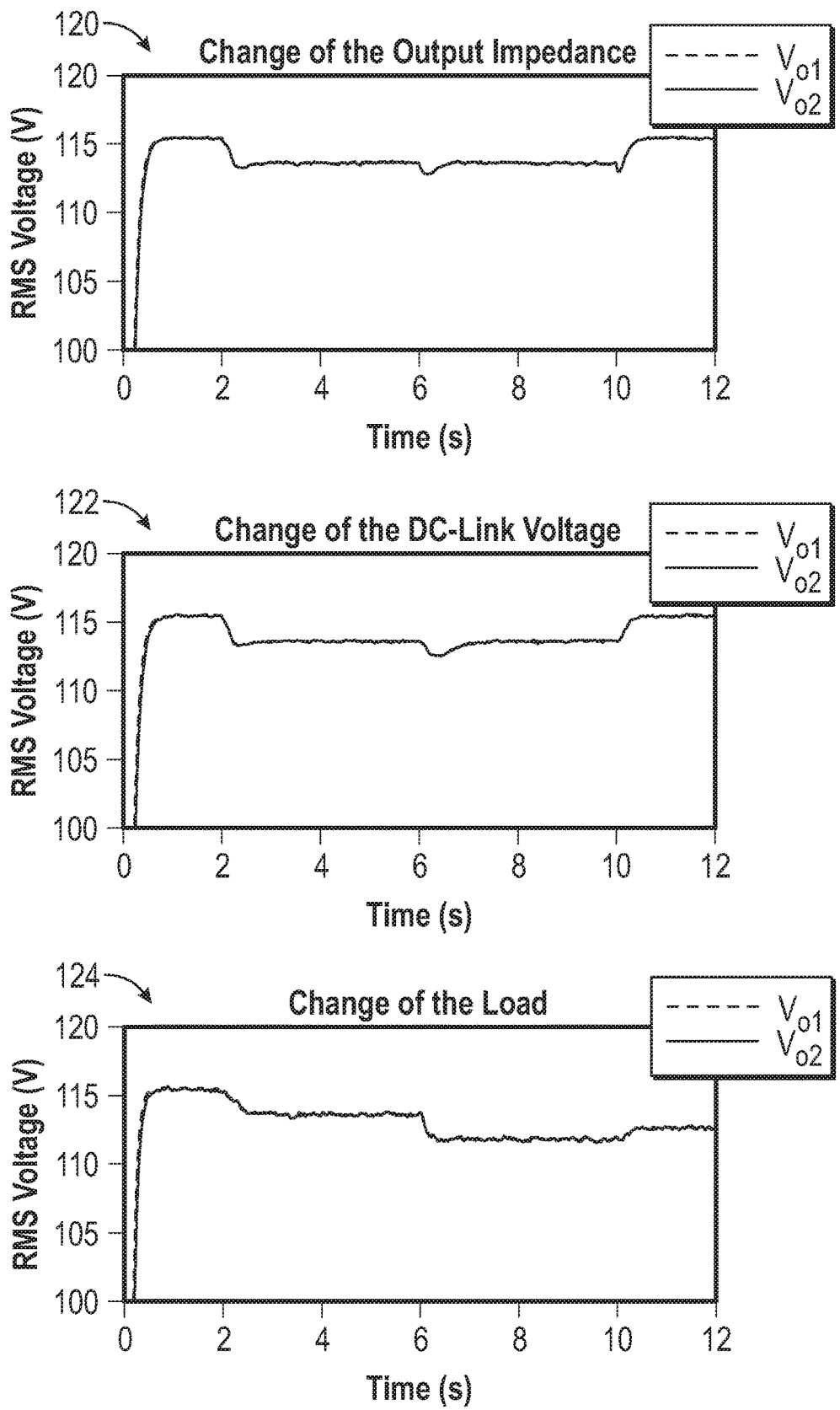

FIG. 4A and FIG. 4B respectively illustrate a pictorial diagram of an experimental setup 40 and a schematic diagram of an improved control circuit 50, in accordance with an example embodiment. The note that the control circuit 50 shown in FIG. 4B is a schematic version of the setup shown in FIG. 4A. To achieve the effectiveness of the UDE-based robust droop control system and components disclosed herein, an experimental embodiment was implemented with two parallel operator inverters as shown in FIG. 4A. The schematic circuit diagram of circuit 50 shown in FIG. 4B includes a load composed of a resistor 53 having a value of $R_L=40\Omega$ in parallel with two capacitors 59 and 57, respectively, 45 ρF capacitors $C_{L1}$ and $C_{L2}$. The capacitor 57 (i.e., $C_{L2}$) is initially bypassed by a switch CB2 for the test of load change.

Inverter I, labeled in FIG. 4B as inverter 52, is connected to the load directly and Inverter II, labeled in FIG. 4B as inverter 70, is connected to the load via a switch CB1. The circuit 50 depicted in FIG. 4B further includes a PWM component 54 connected to the first inverter 54 and a PWM component 68 connected to the second inverter 70 for inverters control respectively. The Inverter I 52 has an output impedance (LC filter) with an inductor 55 having parameters $L_1, R_1$ and a capacitor 58 with parameters $C_1$. The Inverter II 70 has an output impedance (LC filter) with an inductor 66 with parameters $L_2, R_2$ and a capacitor 64 ($C_2$).

In order to synchronize Inverter II to Inverter I, the load voltage $V_{o2}$ is measured by Inverter II. Note that the parameters of the inverters are provided in Table I below. Though the same model of inverters with the same output impedance are used, the sharing ratio of 2:1 corresponding to different power capacities is set in the experimental embodiment. Here, the impedance of inverter includes the parasitic resistance. As mentioned before, the affecting resistance also can be lumped into the uncertain term $\Delta_{qi}$ of equation (11) and compensated in the controller design. The PWM frequency for power electronic devices can be set as, for example, 19.2 kHz for both inverters I and II. Both inverters 52 and 70 can be controlled through a TI controlCARD with T1 F28M35H52C1.

TABLE I

Inverter Parameters

| Parameters | Values | Parameters | Values |
|---|---|---|---|
| $L_1, L_2$ | 7 mH | Nominal $V_{DC}$ | 300 V |
| $R_1, R_2$ | 1 Ω | Rated frequency | 60 Hz |
| $C_1, C_2$ | 1 μF | Rated voltage | 110 $V_{rms}$ |

TABLE II

Control Parameters for Equation (24)

| Parameters | Values | Parameters | Values |
|---|---|---|---|
| $\tau_{q1}, \tau_{q2}$ | 0.0005 s | $K_{q1}, K_{q2}$ | 50 |
| $\tau_{p1}, \tau_{p2}$ | 0.0005 s | $\tau_1, \tau_2$ | 0.001 s |
| $\tau_{r1}, \tau_{r2}$ | 0.0005 s | — | — |

TABLE III

Steady Power Sharing Performances

| Parameters | Values |
|---|---|
| Inverter I apparent power (VA) | 195 + 1.635j |
| Inverter II apparent power (VA) | 97.6 + 81.5j |
| Inverter I RMS current $I_1$ (A) | 2.27 |
| Inverter II RMS current $I_2$ (A) | 1.14 |
| P sharing error $\frac{3(P_1 - 2P_2)}{2(P_1 + P_2)} \times 100\%$ | 0.3% |
| Q sharing error $\frac{3(Q_1 - 2Q_2)}{2(Q_1 + Q_2)} \times 100\%$ | 0.3% |
| Current sharing error $\frac{3(I_1 - 2I_2)}{2(I_1 + I_2)} \times 100\%$ | −0.4% |

In the disclosed embodiments, the UDE filter $G_{fi}(s)$ is chosen as a first-order low-pass filter $$G_{fi}(s) = \frac{1}{1 + \tau_i s}$$

with the time constant $\tau_i$, such that the bandwidth is wide enough to cover the spectrum $\Delta_{qi}$ in equation (11). Then, the UDE-based robust droop control for reactive power sharing of equation (16) with the voltage set-point $E_i$ is derived as:

$$E_i = V_o + \frac{Q_i Z_{oi}}{V_o} + \frac{\tau_{qi} Z_{oi}}{V_o} \left[ \dot{Q}_{ri} + \left( K_{qi} + \frac{1}{\tau_i} \right) e_{qi} + \frac{K_{qi}}{\tau_i} \int_0^t e_{qi} dt \right]. \quad (23)$$

It is worth noting that the control law set forth in equation (23) above includes a derivative term $\dot{Q}_{ri}$. A low pass filter can be introduced to approximate $\dot{Q}_{ri}$ numerically as $$\tilde{Q}_{ri} = \frac{1}{1 + \tau_{ri} s} Q_{ri},$$

from which or in the time domain, $$\tau_{ri} \dot{\tilde{Q}}_{ri} + \tilde{Q}_{ri} = Q_{ri}.$$

With approximate of the derivative term $\dot{Q}_{ri}$ by $\tilde{Q}_{ri}$, the control law of equation (23) is derived as $$E_i = V_o + \frac{Q_i Z_{oi}}{V_o} + \frac{\tau_{qi} Z_{oi}}{V_o} \left[ \frac{Q_{ri} - \tilde{Q}_{ri}}{\tau_{ri}} + \left( K_{qi} + \frac{1}{\tau_i} \right) e_{qi} + \frac{K_{qi}}{\tau_i} \int_0^t e_{qi} dt \right]. \quad (24)$$

The control parameters for the control law of equation (24) are shown in Table II above. The cut-off frequency of the filters $G_{qi}(s)$ and $G_{pi}(s)$ for calculations of real power and reactive power are chosen as $$\frac{1/0.0005}{2\pi} \approx 318 \text{ Hz},$$

as the PWM frequency is 19.2 kHz. The cut-off frequency of the lower filters to approximately $Q_{ri}$ is also chosen as about 318 Hz to cover the spectrum of disturbances and to achieve a fast system response.

The capacities of the two inverters 52 and 70 shown in FIG. 4B can be assumed to be 0.5 kVA and 0.25 kVA, and the droop coefficients are chosen as $n_1$=0.022 and $n_2$=0.044; $m_1$=0.0004$\pi$ and $m_2$=0.0008$\pi$. Hence, it is expected that $P_1$=2$P_2$ and $Q_1$=2$Q_2$, though they have the same output impedance.

FIGS. 5A-5F illustrate a group of graphs 82, 84, 86, 88, 89, and 90 depicting nominal experimental results for power share performance, in accordance with example embodiments. In order to further demonstrate the features and advantages of the disclosed embodiments, two cases are discussed below: Case 1 and Case 2.

Case 1, or the nominal case, involves a situation in which initially the load is connected to Inverter I only, and Inverter II is connected to the load at t=2 s by turning the switch CB1 ON. At t=6 s, the Inverter II is disconnected. The system response curves with the proposed UDE-based robust droop control of equations (16) and (6) are shown in FIGS. 5A-5F. Initially, only Inverter I is connected to the load with switch CB1 OFF and switch CB2 ON. The frequency drop is shown in graph 88 of FIG. 5D due to the effect of positive real power as shown in graph 82 of FIG. 5A. The voltage drop as shown in graph 89 is high in the single-inverter mode, and the negative drop direction is due to the effect of negative reactive power as shown in graph 84 in FIG. 5B with the capacitive load. At t=2 s, the switch CB1 is turned ON, and Inverter II is connected to the load. The load voltage $V_{o2}$ is measured by Inverter II for voltage synchronization with the zero-crossing technique. Some small spikes can be seen in both the real power and the reactive power at the connecting moment, as the voltages on both sides of switch CB1 have little differences before connection.

Both the real power and the reactive power can achieve 2:1 sharing very quickly (within about 0.3 s) after t=2 s. It shows that the UDE-based robust droop control can achieve good power sharing performance with the fast response. With the Inverter II connected to the load, the voltage drop is smaller than that in the single-inverter mode, and the output voltage is closer to the rated voltage. So the UDE-based robust droop control has the good voltage regulation capability. The frequencies of both parallel operated inverters are the same in the steady state, and the frequency drop is also smaller in the parallel-operation mode.

At t=6 s, Inverter II is disconnected, the reactive power and voltage, real power and frequency of Inverter I are back to the initial state. The AC currents at about t=4 s are shown in graph 90 of FIG. 5F, where the current sharing reflects both real power sharing and reactive power sharing well. The corresponding AC voltage is shown in graph 86 of FIG. 5C. In addition, the steady-state sharing performance is shown in Table III. According to the formulas proposed in, for example, Q.-C. Zhong and T. Hornik, Control of Power Inverters in Renewable Energy and Smart Grid Integration, Wiley-IEEE Press 2012 to calculate the sharing errors, the sharing errors for both real power and reactive power are 0.3%, which indicates the UDE-based robust droop control can achieve very accurate power sharing. The RMS AC current sharing error is −0.4%. This small deviation from power sharing errors is caused by sensor errors and harmonics.

Case 2 or the disturbance rejection case: In this case, three disturbances are considered: i) change of the output impedance; ii) change of the DC-link voltage; and iii) change of the load. FIGS. 6A-6D illustrate a group of graphs 102, 104, 106, 108, 110, 112, 114, 116, 118, 120, 122, and 124 depicting transient experimental results under different scenarios, in accordance with example embodiments. Initially, the load is connected to the Inverter I only, with switch CB1 OFF and switch CB2 ON. Inverter II is connected to the load at t=2 s by turning switch CB1 ON. At t=6 s, three disturbances are applied to the system, separately. At t=10 s, Inverter II is disconnected.

i) Change of the output impedance: For change of the output impedance, a virtual output impedance $R_{v1}$=3$\Omega$ with feedback current is added in Inverter I at t=6 s. This virtual output impedance mimics the disturbance from the variation of output impedance.

The experimental results are shown in the left column of FIG. 6. After t=6 s, there is a negative spike in the real power of Inverter I, as the increase of output impedance reduces power output of inverter I, and the real power of inverter II has a positive spike correspondingly, as shown in graphs 102 of FIG. 6A. The frequency responses are shown in graphs 108 of FIG. 6B. Both the real power and frequency settle down quickly within 0.4 s, and real powers still keep 2:1 sharing. The reactive powers of both inverters only have very small spikes and still keep sharing ratio very well as shown in graphs 114 of FIG. 6C. The output voltage has small drop and goes back quickly, as shown in graphs 120 of FIG. 6D. The UDE-based robust droop control can effectively reject the disturbance from variations of the output impedance.

ii) Change of the DC-link voltage: For change of the DC-link voltage, the DC Source I of Inverter I shown in FIG. 4A is tuned to 270 V at t=6 s, which mimics the fluctuating DC-link voltage. The system responses are shown in the middle column of FIG. 6. After t=6 s, the real powers of both inverters only have very small spikes and the corresponding frequencies almost keep stable as shown in graphs 104 and 110 of FIG. 6A and FIG. 6B. The reactive power of Inverter I in graphs 116 of FIG. 6C has a negative spike with more output reactive power delivering instantaneously, as the voltage of Inverter I drops with low DC-link voltage, more reactive power is sent to the load according to equation (4). The reactive power of inverter II has a positive spike correspondingly. Both the reactive powers of two inverters settle down with 2:1 sharing quickly within 0.4 s. The output voltage has small spike and goes back to normal state quickly shown in graphs 122 of FIG. 6D. The UDE-based robust droop control can deal with the fluctuating DC-link voltage.

iii) Change of the load: For change of the load, at t=6 s, switch CB2 is turned OFF to change the capacitive load from 45 µF to 22.5 µF. The system responses are shown in the right column of FIG. 6. After t=6 s, the real power and frequency almost remain unchanged as shown in graphs 106 of FIG. 6A and graphs 112 of FIG. 6B, as the resistive load keeps the same. The reactive powers converge to new stable values in a very short time (within 0.4 s), and the sharing ratio can still keep 2:1, as shown in graphs 118 of FIG. 6C. In graphs 124 of FIG. 6D, the output voltage goes down with lower reactive power output. At t=10 s, Inverter II is disconnected, the real power and frequency of Inverter I are almost back to initial state, while the reactive power is about half of the initial value due to the half capacitive load. The voltage is lower than the initial value due to the lower reactive power output. The experimental results indicate that the UDE-based robust droop control has good robustness against the load change.

The disclosed technology differs from other methods in its ability to compensate for uncertainties and system disturbances. Other droop control methods can only adjust for variations in inverter output impedances and require external regulators. The disclosed technology can adjust not only for varying output impedances, but for drastic load changes and fluctuating DC-link voltages that can occur in practical applications, without requiring external regulatory devices.

Benefits of the disclosed approach include improved reactive power sharing accuracy between parallel inverters used in power grids, improved transient performance between parallel inverters, improved management of system disturbances, such as drastic load changes, variations of output impedance, and fluctuating DC-link voltage, and additionally, there is no longer a concern about matching output impedances of parallel inverters in power grids.

Based on the foregoing, it can be appreciated that a number of example embodiments are disclosed herein. For example, in one embodiment, a system can be implemented for controlling an inverter to achieve proportional load sharing in parallel operation mode. Such a system can include, for example, one or more sensors or a group of sensors that measure the load voltage and the current associated with the inverter; a power unit that calculates the real power and the reactive power of the inverter; a voltage unit that calculates the RMS load voltage; a reactive power reference unit that generates the reactive power reference; a low-pass filter to filter the high-frequency component of the reactive power; a reactive power regulation unit to control the reactive power and generate the amplitude of the control voltage; a real power regulation unit to generate the phase of the control voltage; and a voltage forming unit to form the control signal according to the said amplitude and said phase of the control voltage.

Additionally, in some example embodiments, the reactive power regulation unit can be implemented as a UDE (Uncertainty and Disturbance Estimator)-based controller. Such a UDE-based controller can include a configuration for error dynamics, a UDE filter, and a control configuration. The aforementioned UDE filter can be utilized to estimate model uncertainty and system disturbances associated with the control system. Additionally, the UDE filter can include a flexible design structure that handles different types of uncertainty and disturbances. In some example embodiments, the error dynamics can be specified to satisfy a desired system performance with respect to the control system. The control configuration compensates model uncertainty and system disturbances using an estimation from the UDE filter to achieve desired error dynamics.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A control system for controlling an inverter, comprising:
   a plurality of sensors that measure a load voltage and a current associated with said inverter;
   a power unit that calculates a real power and a reactive power of said inverter;
   an RMS component that calculates an RMS load voltage;
   a reactive power reference generated from a feedback load voltage passed from said RMS component;
   a low-pass filter that filters a high-frequency component from said reactive power;
   a UDE (Uncertainty and Disturbance Estimator)-based controller to control said reactive power and provide a voltage set-point associated with an amplitude of a control voltage, wherein said UDE-based controller comprises a configuration of error dynamics, a UDE (Uncertainty and Disturbance Estimator) filter, and a control configuration;
   another low-pass filter that filters another high-frequency component from said real power;
   a droop coefficient component, a summation component, and an integral component configured to generate a phase of said control voltage; and
   a control output component configured to output said control voltage according to said amplitude and said phase of said control voltage.

2. The system of claim 1 wherein said reactive power reference is provided to said UDE (Uncertainty and Disturbance Estimator)-based controller.

3. The system of claim 1 wherein said UDE filter is used to estimate model uncertainty and system disturbances associated with said control system.

4. The system of claim 1 wherein said UDE filter comprises a flexible design structure that handles different types of uncertainty and disturbances.

5. The system of claim 1 wherein said error dynamics are specified to satisfy a desired system performance with respect to said control system.

6. The system of claim 1 wherein said control configuration compensates model uncertainty and system disturbances using an estimation from said UDE filter to achieve desired error dynamics.

7. A method for controlling an inverter, said method comprising:
- measuring a load voltage and a current associated with said inverter utilizing a plurality of sensors that measure said load voltage and said current associated with said inverter;
- calculating a real power and a reactive power of said inverter with a power unit;
- calculating an RMS load voltage with an RMS component;
- generating a reactive power reference from a feedback load voltage passed from said RMS component;
- filtering a high-frequency component from said reactive power with a low-pass filter;
- controlling said reactive power and providing a voltage set-point associated with an amplitude of a control voltage with a UDE (Uncertainty and Disturbance Estimator)-based controller, wherein said UDE-based controller comprises a configuration of error dynamics, a UDE (Uncertainty and Disturbance Estimator) filter, and a control configuration;
- filtering another high-frequency component from said real power utilizing another low-pass filter;
- generating a phase of said control voltage utilizing a droop coefficient component, a summation component, and an integral component; and
- generating said control voltage according to said amplitude and said phase of said control voltage utilizing a control output component.

8. The method of claim 7 further comprising:
providing said reactive power reference to said UDE (Uncertainty and Disturbance Estimator)-based controller.

9. The method of claim 7 wherein said UDE filter is used to estimate model uncertainty and system disturbances associated with said control system.

10. The method of claim 7 wherein said UDE filter comprises a flexible design structure that handles different types of uncertainty and disturbances.

11. The method of claim 7 wherein said error dynamics are specified to satisfy a desired system performance with respect to said control system.

12. The method of claim 7 further comprising:
compensating, via said control configuration, model uncertainty and system disturbances utilizing an estimation from said UDE filter to achieve desired error dynamics.

13. The method of claim 7 wherein:
- said UDE filter is used to estimate model uncertainty and system disturbances associated with said control system;
- said UDE filter comprises a flexible design structure that handles different types of uncertainty and disturbances; and
- said error dynamics are specified to satisfy a desired system performance with respect to said control system.

* * * * *